Oct. 11, 1927.
E. W. GREACEN
1,645,102
ARTIST'S COMPOSING FRAME AND COLOR CHART
Filed Dec. 10, 1926
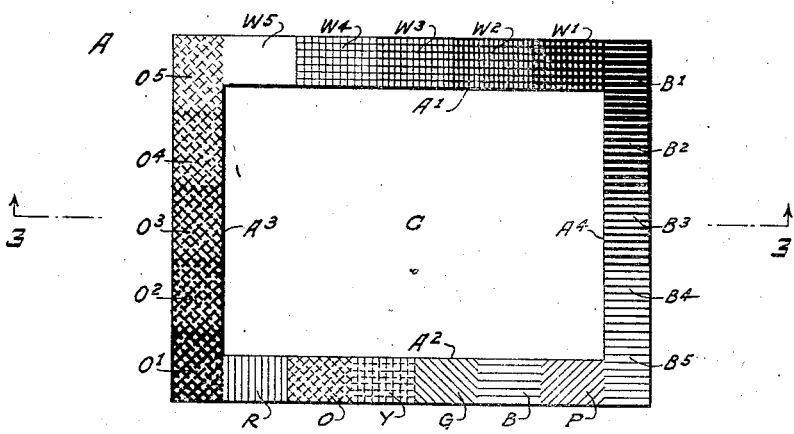
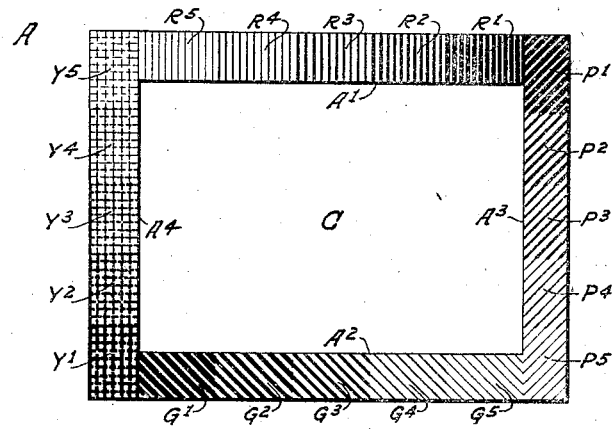
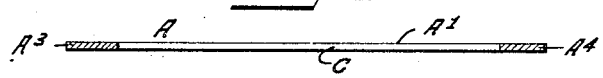
INVENTOR.
Edmund W. Greacen
BY
Duell, Dunn & Anderson
ATTORNEYS.

Patented Oct. 11, 1927.

1,645,102

UNITED STATES PATENT OFFICE.

EDMUND W. GREACEN, OF NEW YORK, N. Y.

ARTIST'S COMPOSING FRAME AND COLOR CHART.

Application filed December 10, 1926. Serial No. 154,019.

This invention relates to improvements in an artist's composing frame with a chart of colors and color values, and more particularly, in some of its details, it relates to improvements in a combined composing frame or view finder and chart of colors and color values for use of artists and art pupils.

It is a general object of the invention to provide a device of the character mentioned which will aid the artist to depict a scene or view with fidelity and exactness and to facilitate the ease and rapidity with which the work may be completed.

It is a more particular object of the invention to provide an improved device of the class mentioned which will assist the artist to compose his picture effectively, and to faithfully reproduce the actual colors and color values at various parts of the picture.

Another object is to provide an improved device of the class mentioned for training the eye of the art student in the correct selection of colors for portraying scenery.

A further object is to provide a device of the character mentioned which, while accomplishing other objects herein mentioned, is simple and inexpensive in construction and light and convenient in use.

Other objects will be, in part, obvious in connection with the following detailed description of an illustrative but preferred embodiment of the invention and will be in part pointed out therein.

The invention accordingly comprises an article of manufacture possessing the features, properties, and the relation of elements which will be exemplified in the article hereinafter described and the scope of the application of which will be indicated in the claims.

For a more complete understanding of the nature and objects of the invention, reference is had to the following detailed description of the illustrative embodiment of the invention and to the accompanying drawings, in which Fig. 1 is a front elevation of a composing frame embodying the invention.

Fig. 2 is a rear elevation of the same, showing obverse surfaces of the frame.

Fig. 3 is a longitudinal sectional view taken approximately on line 3—3 of Fig. 1.

Referring to the drawing for a detailed description of the embodiment of the invention there shown, a rectangular frame A has top and bottom sides $A^1$, $A^2$, and right and left sides $A^3$ and $A^4$. The sides are preferably arranged in rectangular formation, as shown, but if desired they may bear different relative positions. The frame sides enclose a rectangular opening C which forms the observation opening through which the view or scene is observed to assist in its correct composition. The frame may be in the form of a thin, flat plaque, or plate made of some light strong material such, for example, as wood, fiber board or light metal, and may be of any convenient size. A size suitable for ordinary landscape and similar work will be about four or five inches wide, and five or six inches long, outside dimensions, and each side of the frame will be about one-half inch in width.

The top and bottom and lateral sides of the frame have front or obverse surfaces, and back or reverse surfaces, one or the other of these surfaces, therefore, being faced toward the observer when viewing an object through the opening C.

The front surface of the side $A^2$ of the frame is laid off into six zones arranged side by side, and preferably about equal in area and extending all the way to the inner margin of the side so as to lie contiguous to the observation opening C. Each of the zones bears a color which may be coextensive therewith extending entirely to the inner and outer margins or terminals of the plate forming the chart. The zones may, therefore, be referred to as color zones. As shown in Fig. 1, the zone R bears the color red extending to the edge of the observation opening, as do also each of the other colors. Similarly the zone O is colored orange, the zone Y yellow, the zone G green, the zone B blue, and the zone P purple or violet. It will, therefore, be seen that this face of the frame bears the six principal pigmentary colors forming the pigmentary spectrum and being arranged side by side in the adjacent color zones. These colors will ordinarily be saturated, that is, they will be substantially free from black, and therefore free from gray tones.

In a like manner the front surfaces of the three other frame sides $A^1$, $A^2$ and $A^4$, are divided into groups of zones of approximately equal area as shown. The zones on the frame side $A^1$ are provided with different intensities or values in black and white, the intensities ranging progressively from very dark or black in the zone $W^1$ to white in the zone $W^5$.

The color zones of the front surface of the frame side $A^3$ are colored with different shades or color values of one of the pigmentary colors, different shades of orange being shown in the drawing. Thus the shades or color values of the orange vary progressively from very dark orange or orange of low luminosity in zone $O^1$, to light orange or orange of high luminosity in zone $O^5$, with intermediate values positioned between these extremes. These different color values for the orange may be produced by first applying to the different zones progressively varying values in black and white similar to that applied to the zone $W^1$, $W^2$, etc., and varying in intensity from dark in zone $O^1$ to light in zone $O^5$. One or more coats of orange are then placed over all of the zones, thereby producing the effect of different shades or color values of orange, ranging from dark to light. In this manner the different color values of the orange may be presented in grayish tones. The different color values of the other principal pigmentary colors may also be presented in the gray tones on the other surfaces of the frame in a manner similar to that described in connection with the orange.

The color zones of the front face of the frame side $A^4$ may, in a manner similar to that above described for the side $A^3$, be colored with different shades or color values of blue ranging progressively from very dark blue, or blue of low luminosity, in zone $B^1$, to very light blue, or blue of high luminosity in zone $B^5$, the grayish tones appearing in the different zones because of the manner of placing different values of black and white on the different zones prior to application of the blue coloring, as above described.

The reverse surface of the frame is also laid off in groups of zones positioned along each frame side, as described above, for the obverse surface of the frame, the remaining four principal pigmentary colors being arranged along the surface of each frame side in progressively varying color values, varying, as before described, from dark colors, or colors of low luminosity, to light colors, or colors of high luminosity. Thus this reverse surface of the frame side $A^1$, as shown in Fig. 2, is provided with different values of red from dark in zone $R^1$ to light in zone $R^5$; surface of frame side $A^2$ is provided with different values of green from dark in zone $G^1$ to light in zone $G^5$; surface of frame side $A^3$ is provided with different values of purple from dark in zone $P^1$ to light in zone $P^5$; and the corresponding surface of frame side $A^4$ is provided with different values of yellow from dark in zone $Y^1$ to light in zone $Y^5$.

We have, therefore, on the eight surfaces of the frame sides, front and back, the pigmentary spectrum or six principal pigmentary colors, different values of black and white varying progressively from low to high luminosity, and the different color values or shades of the six principal pigmentary colors varying progressively in each instance from low to high luminosity.

In use the composing frame is held in the hand and the proposed view is observed through the observation opening C. The frame is moved or adjusted up or down, and to right or to left, until an artistic and correctly balanced view, with reference to the margins of the observation opening, is obtained. This will present a view of the composition as it is to appear upon the canvas or paper, and will enable the artist or student to visualize more clearly the completed picture. Different parts of the scene ordinarily appear in many different colors and shades, and the color chart above described, with its scheme of color zones, enables the artist to select his colors with accuracy, and thus to depict the various parts of the scene with fidelity to original coloring. Thus if any of the principal pigmentary colors appears in the scene, it can be determined with accuracy by observing it through the observation opening and moving the composing frame until the corresponding color on the chart is brought into juxtaposition thereto, whereby direct comparison can be made and the color accurately determined. Since the colors extend to the inner margin of the frame side, the color of the scene can be brought adjacent to that of the chart whereby the colors can be matched by direct comparison. The color to be applied to the picture or painting can, therefore, be determined with great accuracy. Similarly the varying shades or values of the principal colors appearing in the scene or landscape may be determined from the different surfaces of the charts by direct comparison with the different color zones thereof. Therefore, the different primary colors and different shades or color values of the different primary colors from low to high luminosity in each case, different values in black and white, and the grayish tones, may be accurately determined and applied to the picture.

Since certain changes may be made in the above article, and different embodiments of the invention could be made without departing from the scope thereof, it is intended that all matter contained in the above description or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An artist's composing frame having a surface thereof facing in one direction provided with differently colored zones.

2. An artist's composing frame having obverse and reverse surfaces thereof provided with differently colored zones.

3. An artist's composing frame having sides with surfaces thereof facing in one direction, provided with differently colored zones arranged side by side, the color zones of one or more of the frame sides bearing different color values of one or more of the pigmentary colors.

4. An artist's composing frame having a surface thereof facing in one direction provided with differently colored zones, different parts of said frame surface bearing, respectively, in adjacent zones thereof, different color values of one or more of the pigmentary colors, the principal pigmentary colors, and different intensities or values in black and white.

5. An artist's color chart in the form of a plate having a surface thereof facing in one direction provided with differently colored zones each extending entirely to an adjacent outer margin of the plate, adjacent zones at different parts of said chart surface bearing respectively different color values of different pigmentary colors.

6. An artist's color chart in the form of a plate having a surface thereof facing in one direction provided with adjacent zones bearing respectively different values of a pigmentary color, said surface having certain other adjacent zones at different parts of the chart surface bearing respectively the principal pigmentary colors and different values in black and white, each of said zones extending entirely to an adjacent margin of said chart plate.

7. An artist's composing frame having a plurality of sides arranged at angles with each other to enclose an observation opening, said sides having surfaces thereof facing in one direction, provided with a plurality of juxtaposed zones, certain different groups of adjacent zones bearing respectively the principal pigmentary colors, different values in black and white, and different color values or shades of different pigmentary colors.

8. An artist's composing frame having a plurality of sides arranged at angles to each other to enclose an observation opening, said sides having obverse and reverse surfaces, each bearing a group of juxtaposed zones, certain different groups of adjacent zones bearing, respectively, the principal pigmentary colors, different values in black and white, and different color values or shades of the principal pigmentary colors, ranging progressively from dark to light for each color.

9. An artist's composing frame having sides enclosing an observation opening, the faces of said sides having thereon the principal pigmentary colors, values in black and white varying progressively from low to high luminosity, and different color values of the principal pigmentary colors varying progressively from low to high luminosity.

10. An artist's composing frame in the form of a plate having an observation or composing opening, said plate having a surface thereof provided with a plurality of adjacent color zones extending entirely to the margin of said plate adjacent said opening.

In testimony whereof I affix my signature.

EDMUND W. GREACEN.